United States Patent Office 3,647,755
Patented Mar. 7, 1972

3,647,755
PROCESS FOR THE PREPARATION OF ETHERIFIED MELAMINE RESINS
Arnold Giller, Wehen, Taunus, Germany, assignor to Chemische Werke Albert, Weisbaden-Biebrich, Germany
No Drawing. Continuation of application Ser. No. 724,294, Apr. 25, 1968. This application June 26, 1970, Ser. No. 56,069
Claims priority, application Germany, Apr. 28, 1967, C 42,180; Jan. 20, 1968, C 44,436
Int. Cl. C08g 9/30
U.S. Cl. 260—67.6 R                    9 Claims

ABSTRACT OF THE DISCLOSURE

A process for the manufacture of etherified melamine resins by reacting one mol of melamine at an elevated temperature with less than 3 mols of formaldehyde polymer and at least 4 mols of a monohydric aliphatic water-immiscible alcohol in the presence of a catalytic quantity of an acid and continuously removing water by destillation, coatings and an impregnated material containing the products of the process.

---

This application is a streamlined continuation application of our copending, commonly assigned U.S. application Ser. No. 724,294, filed Apr. 25, 1968, now abandoned.

The invention relates to a process for the preparation of etherified melamine resins.

It has been proposed to produce esterified melamine resins in a single stage, in which a mixture of melamine, formaldehyde, water and butanol is reacted in the presence of an acid catalyst at an elevated temperature and the water which is formed is continuously removed from the mixture. However, in this process a sixfold molar quantity of formaldehyde is used. In addition, with this process the water in the reaction mixture must be removed, this being only possible with considerable effort and loss of time.

Furthermore, it has been proposed to produce melamine resins in a single stage, by condensation and simultaneous etherification, from a mixture of butanol, melamine and formaldehyde in the presence of weak acids. However, this involves the use of more than six times the molar quantity of formaldehyde per mol of melamine.

Therefore both the prior processes have the disadvantages that the products contain appreciable quantities, e.g. 1 to 2%, of free formaldehyde, which is an unpleasant feature due to its pungent smell and irritation of the eyes and respiratory tract. It is an object of the invention to mitigate these disadvantages.

According to the invention, there is provided a process for the manufacture of etherified melamine resins in which one mol of melamine is reacted at an elevated temperature with less than 3 mols of solid formaldehyde polymer and at least 4 mols of a monohydric aliphatic alcohol containing 4 to 10 carbon atoms and which is substantially immiscible with water, in the presence of a catalytic quantity of an acid, and in which water is continuously removed from the reaction mixture by distillation. The reaction may be carried out at the boiling point of the mixture at the applied pressure, i.e. at normal pressure at a temperature, preferably, of at least 90° C.

By means of the process according to the invention particularly pure resins are obtained which contain practically no free formaldehyde, on account of which their processing is rendered particularly agreeable. The alcohol which is preferably used is n-butanol or isobutanol. However, other alcohols such as n- and isopentanols, n-nonanol, isononanol, n-decanol, isodecanols, octanols such as n-octanol, ethyl hexanol or hexanols are suitable.

It is preferred to use formaldehyde in the form of paraformaldehyde, which in the commercially available form may contain up to about 12% water. It is preferable to use a formaldehyde which contains a minimum of water in order to keep the quantity of water small during the reaction.

In order to keep the formaldehyde content of the end product as small as possible, it is advisable, when carrying out the reaction, to ensure that the formaldehyde is present to the extent of more than 2 mols, preferably between 2.4 and 2.9 mols, per mol of melamine. The actual proportion of formaldehyde depends on the type and quantity of the alcohol and the acid catalyst. For example, account should be taken of the fact than n-butanol etherifies more easily than isobutanol and that due to the greater efficiency of monochloroacetic acid as a catalyst, using the same mixture usually smaller quantities of catalyst and possibly also of formaldehyde are preferable than when using other catalysts. For example, 0.002 mol of chloroacetic acid per mol of melamine is sufficient. On the other hand when using, for example, 0.003 to 0.004 mol of maleic acid anhydride and 6 mols n-butanol per mol of melamine, a melamine resin of average viscosity results which is adequately compatible with xylene. It is advisable for the acid content not to exceed 0.008 mol per mol of melamine.

It is in any case advantageous to carry out etherification in such a way that the water which is always formed, and that introduced with the formaldehyde, is removed as quickly as possible from the mixture. In this connection the water which is formed is, for example, removed by azeotropic distillation in the presence of an entrainer and the added entrainer is returned to the reaction mixture after separation of the water (henceforth called "circulation distillation"). Entrainers which can be used are, for example, benzene, toluene, xylene, aliphatic hydrocarbons such as n-hexane, heptanes, octanes or nonanes, cyclohexane or homologs, or hydrocarbon fractions which boil above about 65° C., preferably between 90 and 130°. By using these entrainers it is also possible, for example, to keep the boiling temperatures relatively low. Naturally substances of other types can be used, such as chlorobenzene, especially those which can easily be separated from the reaction products. It is only important that the entrainers do not react with the other substances present.

It is advisable for the entrainer, for example xylene, to be added only when the melamine has dissolved. The best time for adding the entrainer can therefore easily be determined by experiment. After adding the entrainer, e.g. xylene, the resin must remain clear. If added too soon the insufficiently esterified resin can be precipitated. If the entrainer is added too late auto-condensation of the melamine resin which has been assisted by the water is already so far advanced, that adding the entrainer has parctically no effect. The rate of circulation distillation is of great importance to the properties of the end product, such as viscosity and compatibility with solvents such as xylene and white spirit. The quicker the water which is present and formed in the mixture is removed, the smaller the auto-condensation and therefore the viscosity.

According to a particularly advantageous embodiment of the invention, the etherification of the malamine methylol compound first formed is advantageously carried out with the alcohol, which is practically immisible with water, at such reduced pressure that the boiling point of the circulating alcohol is well under its boiling point. The boiling range of the alcohol is generally kept between approximately 15 and 90° C. below its atmospheric boiling point. The lower the atmospheric boiling point of the alcohol the smaller will the difference be selected and the higher the atmospheric boiling point the higher will be the difference. For example, when using isooctanol a boiling point of approximately 120° C. can be selected. It is advisable to carry out etherification at approximately 60 to 130° C. If required it is possible to work at higher temperatures, e.g. should a rapid rate of reaction be necessary. It is then often possible to do without an entrainer for removing the water formed during etherification. In particular, the water which is also formed during etherification is removed much more quickly. Under these conditions the tendency of the melamine resin being formed to auto-condense, which would lead to a higher final viscosity, is much less. In addition, the distillate, when the resin is concentrated to a particular content of solids by distillation, need not be worked up for recovery of an entrainer such as xylene. Finally, a wide choice of acids necessary for the catalysis of the etherification reaction exists.

The following organic or inorganic acids which may be produced from their derivatives, such as their anhydrides can be used as acid catalysts: monochloroacetic acid, maleic acid or its anhydride, sulphuric acid, hydrochloric acid, toluene-sulphonic acid, or mixtures of several such compounds. Monochloroacetic acid is preferably used due to its stronger action.

In addition to the above acids, others can be used which at temperatures above 100° C. are no longer suitable as catalysts. Thus, for example, oragnic acids can be added in large quantities, e.g. up to 4 g. per mol of melamine, in order to accelerate the reaction without having any detrimental effect. Furthermore, weaker organic acids can be used, e.g. phthalic acid, iso- or terephthalic acid, benzoic acid or oxalic acid or their mixtures. If necessary instead of the acids their anhydrides can be used, which are cleaved to form the corresponding acids by any water present or formed by the reaction. These acids, e.g. phthalic acid, therefore act, if required, in statu nascendi as catalysts. Due to the higher acid content and the reduced reaction temperature, according to this method highly reactive resins are obtained with an improved compatibility with aromatic hydrocarbons such as xylene.

The degree of etherification of the resin can also be increased by using more alcohol. This increases the compatibility of the resin with xylene and other hydrocarbons.

It is advantageous to neutralise the resins formed after the desired degree of etherification has been reached by adding at least an equivalent amount of alkali. It is advisable to use an alkali excess of, for example, 50 to 100%. The alkali can, for example, be added in the form of sodium or potassium hydroxide, ammonia or an alkaline reacting salt, such as sodium carbonate, bicarbonate or the like. When sodium or potassium hydroxide are used these are advisably added in the form of a highly dilute solution or as an alcoholic solution. If gaseous ammonia for example is used the advantage is obtained that any formaldehyde radicals still present react. The alkali should not be added at too high a temperature, preferably between about 60 and 80° C., as otherwise yellow colouration can occur. After adding the alkali it is recommended that the resin should be boiled again to allow any esters which have formed to be saponified.

Resins prepared according to the invention are characterised by their particular purity. They contain no free formaldehyde and are therefore odourless, so that in processing no irritation of the eyes and respiratory tracts of operatives occurs. Products which have been neutralised with alkali and then boiled again remain stable for many months of storage at elevated temperatures and their viscosity hardly changes.

The melamine resins produced according to the invention can, for example be used in the manufacture of paints and coatings. After adding alkyd resins and pigments they are particularly suitable for the manufacture of good quality rapid stoving varnishes. The use of these varnishes is particularly advantageous because they can be stoved at temperatures of approximately 80° C. and given excellent coatings after only 30 minutes. Stoving varnishes based on known melamine resins require a longer time or higher temperatures for the same hardening. In addition, the products obtained according to the invention are also suitable as impregnating and bonding agents, for example wood, paper and textiles.

In order that the invention may be well understood the following examples are given by way of illustration only:

EXAMPLE 1

(a) 252 g. of melamine, 186 g. of solid formaldehyde polymer containing 9% water, 888 g. n-butanol and 0.6 g. monochloroacetic acid are mixed in a three-necked flask fitted with a stirrer. The mixture is heated to boiling accompanied by stirring. The volatile constituents are distilled off. Four minutes after the start of distillation xylene is dripped in and eight minutes later 100 g. of xylene are added. Distillation is conducted for a total of one hour, whereby 77.5 ml. of water are separated and the xylene being distilled off and which at the same time serves as an entrainer, is returned to the reaction mixture after separation of the water ("circulation distillation"). The mixture is then cooled as quickly as possible to 70 to 80° C. and mixed with 2 g. of 33% caustic soda solution. Circulation distillation is then conducted for a further hour. Subsequently the mixture is concentrated until the water has been completely removed. Finally, by using n-butanol a solid resin content of about 54% is obtained, determined by stoving 2 g. of resin for an hour at 120° C. The resin is compatible with xylene in a weight ratio of 1:15. The compatibility is determined by increasing dilution of the resin with a solvent, e.g. xylene, to a definite ratio. The onset of turbidity shows the compatibility.

No free formaldehyde was found in the resin.

(b) With a resin having the same percentage composition but containing, however, in place of chloroacetic acid, maleic acid anhydride, and in place of formaldehyde, paraformaldehyde, a compatibility of 1:10 with xylene is obtained.

The resin according to (a) was compared with respect to its lacquer characteristics with a commercially available melamine resin, which was completely compatible with xylene and contained approximately 2.5% free formaldehyde.

A mixture was prepared from 48.5 g. melamine resin, 100 g. of a low-grade alkyd resin (60%) prepared from 36% phthalic anhydride, 42% dehydrated castor oil and 22% trimethylol propane and with an acid number under 40, 85.7 g. titanium dioxide and 3 g. ethylene glycol monoethyl ether. This mixture, with about 30 to 35 g. of a mixture of 8 parts xylene and 2 parts butanol, was adjusted to an outflow time of 80 sec. in the DIN discharge beaker with a 4 mm. nozzle.

The paints prepared in this way were applied to glass plates in thicknesses of 100 microns and stoved for 30 minutes at 80° C. The hardness of the films was measured with a pendulum measuring instrument according to Konig (Farbe und Lack, vol. 59, 1953, p. 435). The composition obtained according to the invention had a pendulum hardness of 87 sec. and the composition obtained from the commercially available resin only had a pendulum hardness of 59 sec.

EXAMPLE 2

A mixture of 504 g. melamine, 347 g. solid formaldehyde polymer containing 9% water, 1176 g. iso-butanol and 1.6 g. monochloroacetic acid in a 4 l. steel tank is heated to boiling accompanied by stirring. Five minutes after boiling has commenced, the dripping in of 244 g. xylene is begun and this lasts for eight minutes. Circulation distillation then takes place for three hours, whereby 178 g. of water are separated. Subsequently the resin is cooled to at least 80° C. and mixed with 34 g. of a 3.9% caustic soda solution. It is then again distilled in circulation for one hour and by distilling off the entrainer the solid resin content is brought to about 54%. The resin has a viscosity of approximately 1000 cp. and the amount of free formaldehyde is below 0.1%. It is compatible with xylene in a weight ratio of 1:10.

EXAMPLE 3

378 g. melamine, 280 g. of 91% paraformaldehyde, 1332 g. n-butanol and 7.5 g. phthalic anhydride are placed in a three-necked flask with stirrer and thermometer. The mixture is heated to boiling accompanied by stirring. When the melamine is in solution the pressure is reduced and the boiling point is regulated to 75 to 80° C. In 2½ hours about 124 ml. of water are separated, whereafter 10 g. of 33% caustic soda solution, diuted with 50 ml. of water, are added. Then by further distillation the water is removed and the solid resin content is set at about 54% by weight. The resin is compatible with xylene in a weight ratio of 1:25.

(b) With a resin of the same composition but containing monochloroacetic acid instead of the phthalic anhydride, a compatibility ratio of 1:40 with xylene was obtained.

EXAMPLE 4

126 g. of melamine, 87 g. of a solid paraformaldehyde containing 3% water, 780 g. of isooctyl alcohol (boiling range 184 to 190° C. at 760 torr, density $d\ 20°/4°$ 0.830 to 0.834) and 0.4 g. phthalic anhydride are heated to 115° C. in an apparatus as described in Example 1. As a result of exothermal reaction the temperature rises still further to approximately 120° C. The melamine dissolves and after about 20 minutes 100 ml. cyclohexane are dripped in and 0.8 g. of monochloroacetic acid are added. Subsequently, at a boiling point of about 100° C., distillation is conducted for 2½ hours until substantially no more water distils off. After cooling to 80° C., 1 g. of NaOH dissolved in 10 to 15 ml. water is added. Dehydration is performed again by further distillation and subsequently the mixture is filtered. Concentration then takes place in vacuo to give a stoving residue (1 hour, 150° C.) of 64 to 65% by weight, followed by dilution with xylene to a solid resin content of 53% by weight. The resin obtained is compatible with xylene and white spirit containing aromatics in any ratio.

I claim:

1. A process for the manufacture of etherified melamine resins which comprises reacting one mol of melamine at an elevated temperature with more than 2 mols and less than 3 mols of solid paraformaldehyde and at least 4 mols of a monohydric aliphatic alcohol containing 4 to 10 carbon atoms in the presence of a catalytic quantity of an acid and continuously removing water from the reaction mixture by distillation, the temperature being at least 60° C. at normal pressure and at reduced pressure up to 90° C. below its boiling point under atmospheric conditions and wherein the etherified resinous product is neutralized.

2. A process as claimed in claim 1 wherein 2.4 to 2.9 mols of paraformaldehyde per mol of melamine are used.

3. A process as claimed in claim 1 wherein a catalytic amount of a monochloroacetic acid or phthalic acid is used.

4. A process as claimed in claim 1 wherein the catalytic amount of acid is at most 4 g. per mol of melamine.

5. A process as claimed in claim 1 wherein the etherified resinous product is neutralized with alkali and the resinous solution is then subjected to vaporizing conditions.

6. A process as claimed in claim 1 wherein the initially obtained melamine methylol compound is etherified with the alcohol under such a reduced pressure that the boiling temperature of the alcohol is in the range of 15 to 90° C. less than the normal boiling point of the alcohol and wherein this difference is generally increased with the increasing normal boiling point.

7. A process as claimed in claim 1 wherein an entrainer is also added to the reaction mixture.

8. A process as claimed in claim 7 wherein said entrainer is added to the reaction mixture after all the melamine has been dissolved.

9. A process as claimer in claim 1 wherein the reaction is performed at a temperature between approximately 60 to 130° C.

References Cited

UNITED STATES PATENTS 2,971,943   2/1961   Lombardi.

FOREIGN PATENTS 572,239   9/1945   Great Britain.
867,806   5/1961   Great Britain.

WILLIAM H. SHORT, Primary Examiner

T. E. PERTILLA, Assistant Examiner

U.S. Cl. X.R.

260—850